(12) United States Patent
Boerstler

(10) Patent No.: US 6,987,824 B1
(45) Date of Patent: Jan. 17, 2006

(54) METHOD AND SYSTEM FOR CLOCK/DATA RECOVERY FOR SELF-CLOCKED HIGH SPEED INTERCONNECTS

(75) Inventor: David William Boerstler, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 09/666,277

(22) Filed: Sep. 21, 2000

(51) Int. Cl.
  *H04L 7/02* (2006.01)
(52) U.S. Cl. .................. 375/359; 375/361; 375/364; 375/220; 341/70; 327/165; 327/227; 324/103 R
(58) Field of Classification Search ............ 375/359, 375/361, 364, 220; 341/70; 327/165, 227; 324/103 R
See application file for complete search history.

(56) References Cited

U.S. PATENT DOCUMENTS

| | | | |
|---|---|---|---|
| 3,820,031 A * | 6/1974 | Smithlin ................... 341/70 |
| 3,838,448 A * | 9/1974 | Garde et al. ................ 360/45 |
| 3,967,061 A * | 6/1976 | Dobias ...................... 375/361 |
| 4,229,823 A * | 10/1980 | Thomson et al. .......... 375/364 |
| 4,361,895 A | 11/1982 | Khoudari ................... 375/87 |
| 4,439,717 A * | 3/1984 | Berney ...................... 318/696 |
| 4,459,591 A * | 7/1984 | Haubner et al. ....... 340/825.57 |
| 4,513,329 A | 4/1985 | Gomez et al. .............. 360/42 |
| 4,535,299 A * | 8/1985 | Streckmann et al. ....... 330/279 |
| 4,592,072 A * | 5/1986 | Stewart ..................... 375/282 |
| 4,661,965 A * | 4/1987 | Maru ......................... 375/361 |
| 4,788,605 A | 11/1988 | Spiesman et al. .......... 360/42 |
| 4,807,260 A | 2/1989 | Solina ....................... 375/110 |
| 4,876,700 A * | 10/1989 | Grindahl .................... 375/333 |
| 5,003,562 A * | 3/1991 | van Driest et al. ......... 375/327 |
| 5,023,891 A | 6/1991 | Johnson, III ............... 375/87 |

(Continued)

OTHER PUBLICATIONS

Bill Bowden; http://ourworld.compuserve.com/homepages/bill_Bowden/page9.htm ; pp. 1-9 ("Monostable flip-flop" on p. 6).*

(Continued)

*Primary Examiner*—Stephen Chin
*Assistant Examiner*—Sudhanshu C. Pathak
(74) *Attorney, Agent, or Firm*—Duke W. Yee; Casimer K. Salys; Stephen R. Tkacs

(57) ABSTRACT

A method and system is provided for clock/data recovery for self-clocked high speed interconnects. A data signal is received and then equalized. The equalized data signal then provides the trigger to separate "ones" and "zeros" one-shots. The equalized Manchester data signal is also integrated, compared with a threshold value to determine the negative and positive peaks of the data signal. Then after the appropriate peak is determined, a mid-bit signal is sent as input to a set-reset flip-flop which thereby outputs an asynchronous recovered non-return to zero signal. This asynchronous recovered non-return to zero signal then provides an enable input to the "ones" one-shot and the complementary asynchronous recovered non-return to zero signal provides an enable input to the "zeros" one-shot. The "ones" one-shot outputs a "ones" clock signal and the "zeros" one-shot outputs a "zeros" clock signal. These two signals are verified and a recovered clock out signal is provided. The asynchronous recovered non-return to zero signal is supplied to a data flip-flop along with the recovered clock out signal and a constant and the result is a synchronous recovered non-return to zero signal.

45 Claims, 11 Drawing Sheets

U.S. PATENT DOCUMENTS

| | | | | |
|---|---|---|---|---|
| 5,686,849 A | * | 11/1997 | Burzio | 327/165 |
| 5,748,123 A | | 5/1998 | Lee | 341/70 |
| 5,880,898 A | * | 3/1999 | Park | 360/51 |
| 5,920,219 A | * | 7/1999 | Young et al. | 327/227 |
| 6,008,746 A | | 12/1999 | White | 341/70 |
| 6,028,461 A | * | 2/2000 | Kobayashi | 327/155 |
| 6,130,561 A | * | 10/2000 | Dufour | 327/105 |
| 6,392,399 B1 | * | 5/2002 | Bernard | 324/103 R |
| 6,765,954 B1 | * | 7/2004 | Eichrodt et al. | 375/220 |

OTHER PUBLICATIONS

Digit Circuit; www.silicom.com/~pelican2/DIGIT_CIRCUIT.html ; pp. 1-4 ("Anti-Jitter circuit" on p. 4).*

* cited by examiner

METHOD AND SYSTEM FOR CLOCK/DATA RECOVERY FOR SELF-CLOCKED HIGH SPEED INTERCONNECTS

BACKGROUND OF THE INVENTION

1. Technical Field

The present invention relates generally to an improved data processing system, and in particular to a method and system for managing data within a data processing system. More particularly, the present invention relates to the field of clock/data recovery for self-clocked high speed interconnects.

2. Description of Related Art

Interconnect effects are critically important in the design and verification of integrated circuits. On-chip interconnects are typically modeled by linear resistive (R) and capacitive (C) elements. With the scaling of the Back-End-Of-the-Line (BEOL) interconnect processes, the effect of interconnect on circuit performance continues to increase. In case of global nets (i.e., nets connecting one macro to another macro), the interconnect delay may typically be much greater than the logic delay. Even among nets within a macro the interconnect delay may constitute a significant portion of the path delay (i.e., typically up to 25%).

High speed interconnections between processors or switch elements are one of the main bottlenecks to system performance today as system bandwidth requirements grow geometrically. Many factors contribute to this problem, for example, chip and packaging density, power dissipation, logic switching speeds, available low-noise analog circuit technologies, and the like. As speeds increase the nonlinear loss mechanisms through the channel require more precise detection techniques involving sensitive analog circuits, such as phase-locked loops (PLLs), for recovery of the timing information and sampling of the data stream.

A PLL integrated in a mixed-signal environment containing other PLLs and many noise-producing digital circuits may have unpredictable degradation on performance. For example, a PLL integrated in a mixed-signal environment containing other PLLs may force fundamental or harmonic false-locking due to injection or other effects. In addition, bandwidth-preserving transmission such as non-return-to-zero (NRZ) with some form of run-length-limitation requires advanced clock recovery techniques due to low transition density and no component at the clock frequency.

With Manchester data transmission, a serial data stream contains both the clock and the data, with the position of the mid-bit transition representing the clock, and the direction of the transition representing the data. Manchester has bandwidth, error detection, and synchronization advantages over NRZ code. However, presently available Manchester clock and recovery systems use precise delay lines or one-shots which are difficult to integrate precisely using existing CMOS process technology.

Thus, it would be advantageous to have an improved method and system for clock/data recovery for self-clocked high speed interconnects.

SUMMARY OF THE INVENTION

The present invention provides a method and system for clock/data recovery for self-clocked high speed interconnects. A data signal is received and then equalized. The equalized data signal then provides the trigger to separate "ones" and "zeros" one-shots. The equalized Manchester data signal is also integrated, compared with a threshold value to determine the negative and positive peaks of the data signal. Then after the appropriate peak is determined, a mid-bit signal is sent as input to a set-reset flip-flop which thereby outputs an asynchronous recovered non-return to zero signal. This asynchronous recovered non-return to zero signal then provides an enable input to the "ones" one-shot and the complementary asynchronous recovered non-return to zero signal provides an enable input to the "zeros" one-shot.

The "ones" one-shot outputs a "ones" clock signal and the "zeros" one-shot outputs a "zeros" clock signal. These two signals are verified and a recovered clock out signal is provided. The asynchronous recovered non-return to zero signal is supplied to a data flip-flop along with the recovered clock out signal and a constant and the result is a synchronous recovered non-return to zero signal.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
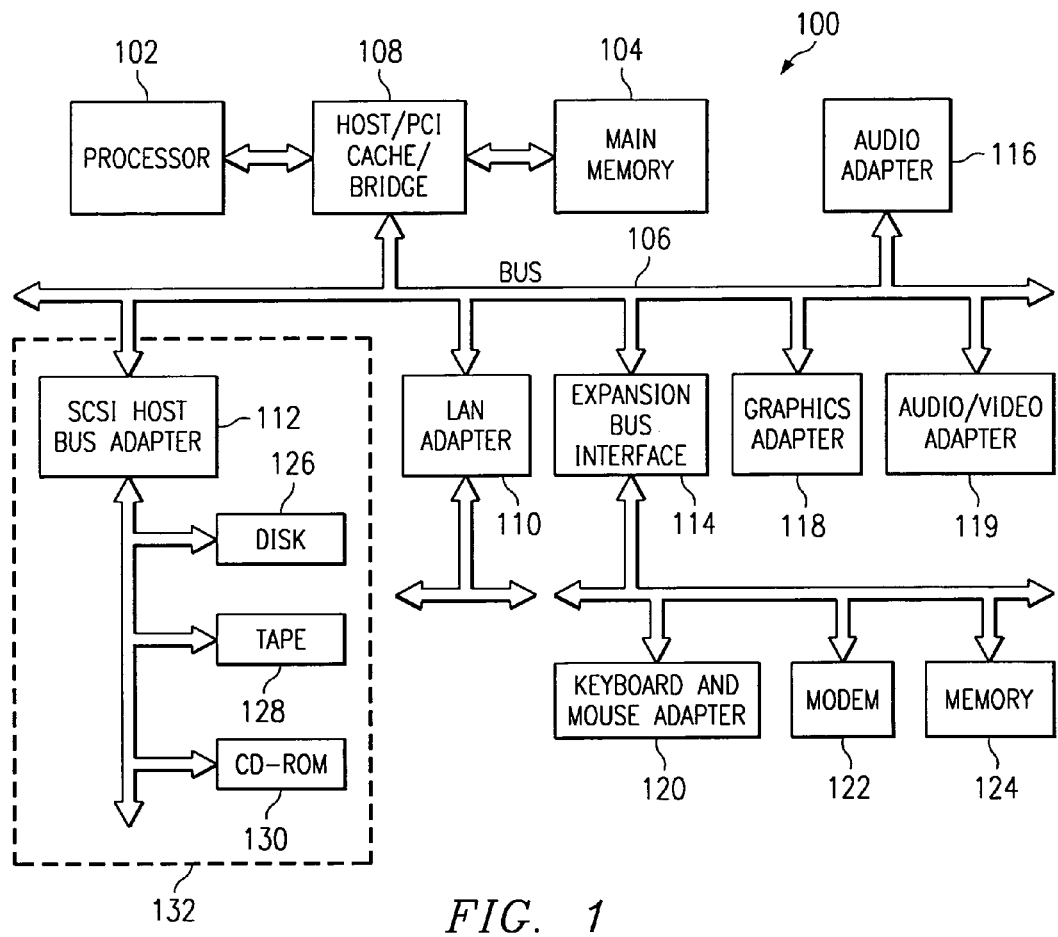
FIG. 1 is a block diagram illustrating an exemplary data processing system in which the present invention may be implemented.

FIG. 1 is a block diagram illustrating an exemplary data processing system in which the present invention may be implemented. Data processing system 100 is an example of a client computer. Data processing system 100 employs a peripheral component interconnect (PCI) local bus architecture. Although the depicted example employs a PCI bus, other bus architectures such as Micro Channel and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. Instructions for the operating system and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1.

Also, the processes of the present invention may be applied to a multiprocessor data processing system. For example, data processing system 100, if optionally configured as a network computer, may not include SCSI host bus adapter 112, hard disk drive 126, tape drive 128, and CD-ROM 130, as noted by dotted line 132 in FIG. 1 denoting optional inclusion. In that case, the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device which is configured with ROM and/or flash ROM in order to provide non-volatile memory for storing operating system files and/or user-generated data.

The depicted example in FIG. 1 and above-described examples are not meant to imply architectural limitations.

The present invention provides a method and system for improved clock/data recovery for high-speed self-clocked interconnects. The self-clocked transmission system of the present invention has many advantages over the prior art, such as, for example, eliminating the requirement for advanced clock and data recovery techniques, eliminating the need for using phase-locked loops or exotic filters (e.g., surface-acoustic-wave filters), reduces mixed-signal coupling concerns (e.g., injection lock), potential power savings, reduced complexities inherent in phase-locked loops, improved migrateability, reduction of physical space requirements, and the like.

A Manchester, also known as a biphase or split-phase, type of encoding has been used in this example in which mid-bit transitions are guaranteed for every bit. A rising mid-bit transition signifies a logic "1" and a falling mid-bit transition signifies a logic "0" and appropriate transitions at the bit boundaries to ensure the correct mid-bit transitions.

In a preferred embodiment of the present invention, when data is received via communications links to network computers using a communications unit, such as, for example, modem 122 in data processing system 100 in FIG. 1, the present invention detects mid-bit transitions in the Manchester data which may not have an edge transition immediately preceding the bit. In such a case, for an edge transition to be absent, a "1" must be immediately preceded by a "0" or a "0" must be immediately preceded by a "1." In either situation either transmitted sequence may not force an edge transition between the two bits in the Manchester data stream. Once such a mid-bit transition is detected, the decoding operation may be accomplished using a clock data recovery system.

The received data is equalized and may provide a series of further input signals for the clock data recovery (CDR) system of the present invention. The equalized data signal may also be further processed by, for example, integration, and this integrated signal compared to a positive and negative threshold value to determine if a mid-bit transition exists for the portion of the data signal being processed. If a positive or negative mid-bit is detected, this detection may provide input to a bistable circuit component and the resulting bistable component output coupled with the equalized data signal may provide input to a plurality of monostable circuit components which may, in turn, output a recovered clock signal. A monostable circuit component provides a pulse of known height and known width in response to a trigger signal. Because the width of the pulse is predictable, the pulse's trailing edge may be used for timing purposes.

Figure 2:
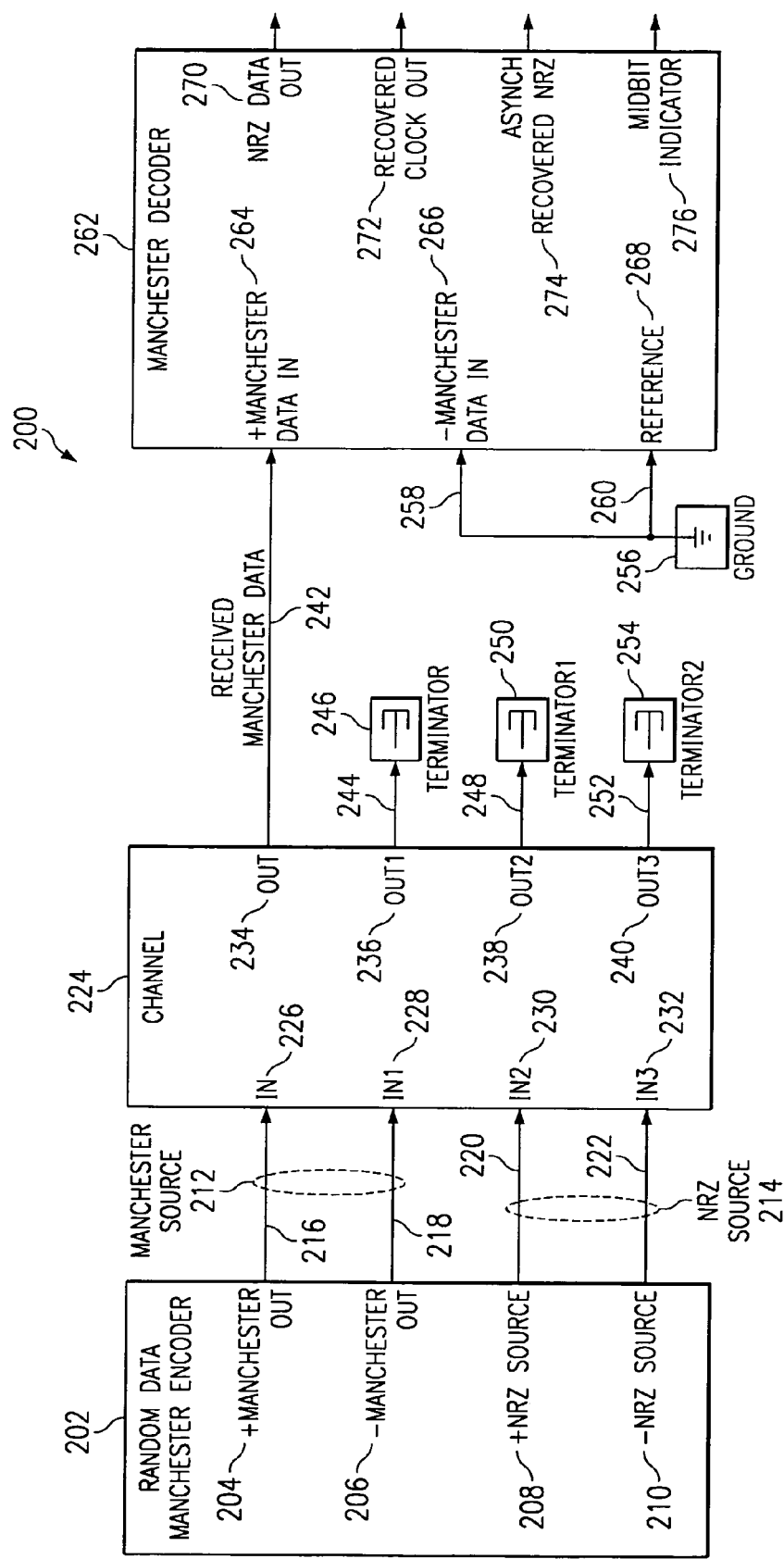
FIG. 2 illustrates an exemplary link containing an encoder, a channel, and a decoder in which the present invention may be implemented.

FIG. 2 illustrates an exemplary link containing an encoder, a channel, and a decoder in which the present invention may be implemented. Decoder 262 may be attached to PCI local bus 106 which is a part of data processing system 100 in FIG. 1.

In this example, encoder 202 performs the process of converting data into code or an analog signal into a digital signal and may be any type of encoder, such as, for example, a Manchester encoder. In addition, a random data Manchester encoder may not be restricted to a differential or complementary type encoder. In this example, encoder 202 operates at 5 Gbaud, although, encoder 202 may operate at other baud rates. Channel 224 is a transmission path on a data bus, such as, for example bus 106 in FIG. 1. Decoder 262 changes a digital signal into an analog signal or into another type of digital signal and may be any type of decoder, such as, for example, a Manchester decoder.

In this example, the output from random data Manchester encoder 202, includes Manchester out positive (+) output terminal 204, Manchester out negative (−) output terminal 206, NRZ source positive (+) output terminal 208, and NRZ source negative (−) output terminal 210. The combination of Manchester out positive (+) signal 216 and Manchester out negative (−) signal 218, comprise Manchester source signal 212, which may be transmitted to channel 224. In addition, the combination of NRZ source positive (+) signal 220 and NRZ source negative (−) signal 222 comprise a NRZ source signal 214, which also may be transmitted to channel 224.

Furthermore, in this example, channel 224 includes inputs "in" 226, "in1" 228, "in2" 230, and "in3" 232. Channel 224 also contains outputs "out" 234, "out1" 236, "out2" 238, and "out3" 240. Manchester source signal 212 is transmitted from encoder 202 to channel 224. Manchester out positive (+) signal 216 and Manchester out negative (−) signal 218 are received by channel 224 at inputs "in" 226 and "in1" 228, respectively. Furthermore, NRZ source signal 214 is transmitted from encoder 202 to channel 224. NRZ source positive (+) signal 220 and NRZ source negative (−) signal 222 are received by channel 224 at inputs "in2" 230 and "in3" 232, respectively. Received Manchester data signal 242 is transmitted from channel 224 via output "out" 234 and output signals 244, 248, and 252 are transmitted from "out1" 236, "out2" 238, and "out3" 240 to terminators 246, 250, and 254, respectively. Terminators 246, 250, and 254 may be used, for example, for unused outputs. These terminators may be used to suppress error messages in the simulation process.

Additionally, in this example, Manchester decoder 262 contains inputs Manchester data in positive (+) terminal 264, Manchester data in negative (−) terminal 266, and reference terminal 268. Manchester data in positive (+) terminal 264 receives Manchester data signal 242 from channel 224. Manchester data in negative (−) terminal 266 and reference signal 268 are connected via connections 258 and 260 to ground 256. Manchester decoder 262 also contains outputs terminals NRZ data out 270, recovered clock out 272, asynchronous recovered NRZ 274, and mid-bit indicator 276. The outputs from decoder 262 provide the signals needed for proper coordination and processing of data.

The data signal processing using encoder 202, channel 224, and decoder 262 is a way of receiving a data signal and processing the signal to provide needed outputs, such as, for example, signals from NRZ data out 270, recovered clock out 272, asynchronous recovered NRZ 274, mid-bit indicator 276, and the like.

Figure 3:
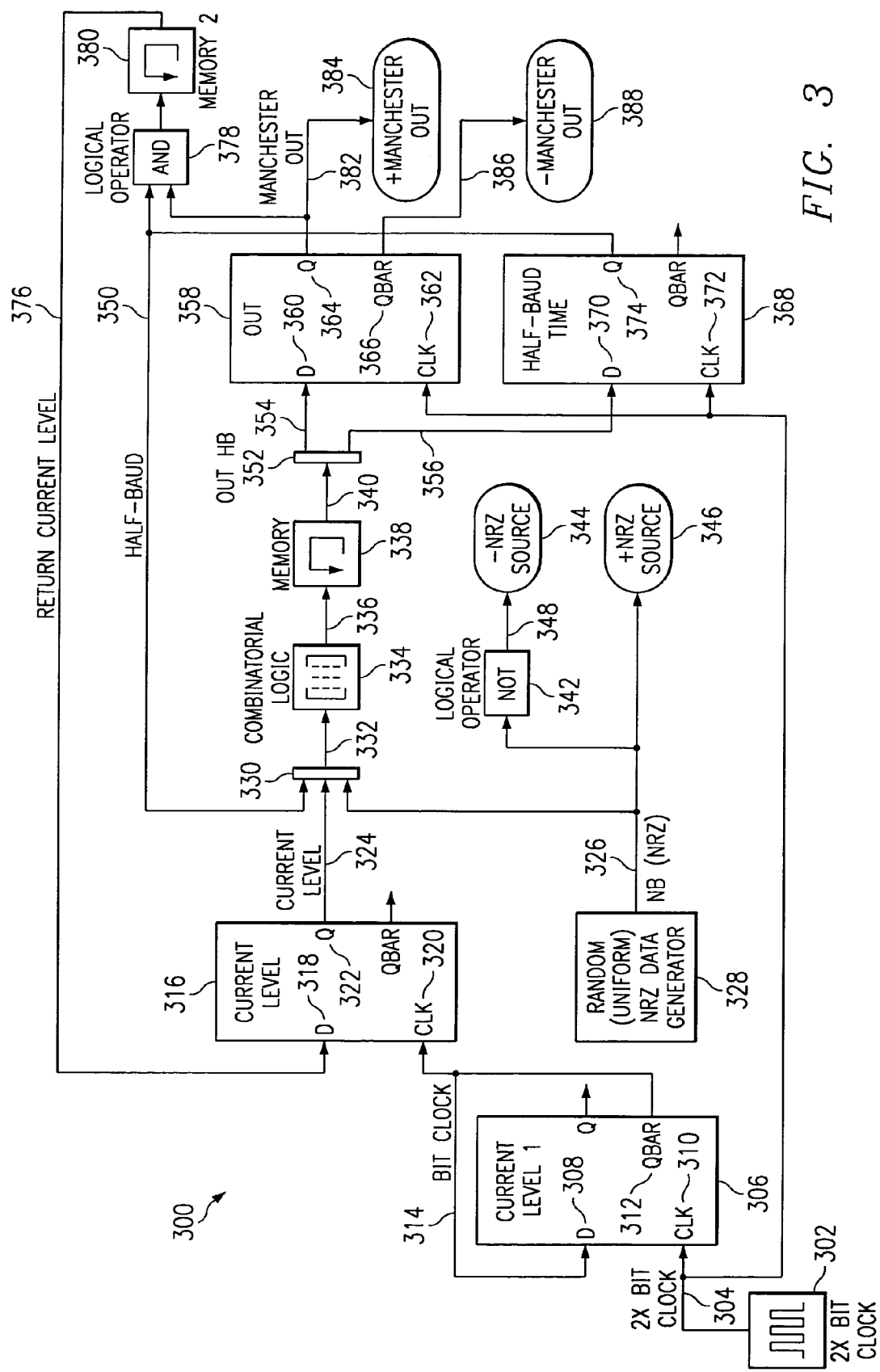
FIG. 3 illustrates an exemplary encoder in which the present invention may be implemented.

FIG. 3 illustrates an exemplary encoder in which the present invention may be implemented. In this example, a 5 Gbit/second random NRZ data stream may be used as the source for encoder 300, which may be used in encoder 202 in FIG. 2. Encoder 300 may modify a bit clock and random NRZ (non-return to zero) data to change frequency. The encoder may generate complementary Manchester data at 5 Gbaud, which may be presented to a channel, such as, for example, channel 224 in FIG. 2. The channel may be modeled with a double-pole at 2 GHz to provide a simple attenuation characteristic. If the 5 Gbaud signal is generated, mid-bit transitions may be delayed by 0.5 baud with respect to the non-return to zero data signal and the mid-bit transitions may occur at even times.

In this example, "2X" bit clock 302 with a frequency of 10 GHz emits "2X" bit clock signal 304. "2X" bit clock 302 may emit a clock signal which may be twice the input bit clock signal. "2X" bit clock signal 304 is transmitted to data (D) flip-flop "Current level 1" 306 and is received at clock (CLK) input 310. "2X" bit clock signal 304 is also transmitted to D flip-flop "Half-Baud time" 368 and D flip-flop "Out" 358. D flip-flop "Current Level 1" 306 outputs bit clock signal 314 with a frequency of 5 GHz from complementary output (Qbar) 312 and bit clock signal 314 is transmitted to D flip-flop "Current Level" 316 and also provides feedback to "D" input 308 at D flip-flop "Current Level 1" 306. Bit clock signal 314 is received at "CLK" input 320 at D flip-flop "Current level" 316. D flip-flop "Current level" 318 also receives "Return Current Level" signal 376 at data (D) input 318. D flip-flop "Current level" 316 outputs "Current Level" signal 324 from output (Q) 322 which is then transmitted to data bus 330.

Data bus 330 also receives next bit (NB) NRZ signal 326 generated by random (uniform) non-return to zero (NRZ) data generator 328. In addition, data bus 330 receives HB (half-baud) signal 350 from "Half Baud time" D flip-flop 368. Next bit (NB) non-return to zero (NRZ) signal 326 provides NRZ source positive (+) signal 346 at Manchester encoder 202 in FIG. 2 and is also transmitted to logical "NOT" operator 342. Data bus 330 combines "Current Level" signal 324, next bit (NB) non-return to zero (NRZ) signal 326, and "Half-Baud" signal 350 and outputs signal 332 to combinational logic module 334. In turn, combinational logic 334 outputs signal 336 to memory 338. Then memory 338 outputs signal 340 to Out/Half-Baud bus 352. Out/Half-baud bus 352 splits signal 340 from Memory 338 into two output signals 354 and 356, signal 354 transmitted to D flip-flop "Out" 358 and signal 356 transmitted to D flip-flop "Half-Baud time" 368.

D flip-flop "Out" 358 receives signal 354 from Out/Half-Baud bus 352 at "D" input 360 and "2X" bit clock signal 304 at "CLK" input 362. D flip-flop "Out" 358 outputs signal 382 from "Q" output 364 and signal 386 from "Qbar" output 366. The signal from "Q" output 364 provides Manchester out positive (+) signal 382 to an encoder, such as, for example, Manchester encoder 202 in FIG. 2 and Manchester out positive (+) signal 382 is also transmitted to provide input to logical "AND" operator 378. The signal from "Qbar" output 366 provides Manchester out negative (−) signal 386 to an encoder, such as, for example, Manchester encoder 202 in FIG. 2.

D flip-flop "Half-time baud" 368 receives signal 356 from Out/Half-Baud bus 352 at "D" input 370 and also receives "2X" bit clock signal 304 at "CLK" input 372. D flip-flop "Half-Baud time" 368 outputs Half-Baud signal 350 to data bus 330 which is also transmitted to provide input to logical "AND" operator 378. The output signal from logical "AND" operator 378 is transmitted to memory "2" 380, which in turn, provides "Return Current Level" signal 376 to "D" input 318 at D flip-flop "Current Level" 316.

The data signal produced from Manchester encoder 300 is then sent to provide input, for example, input to a channel, such as, for example, channel 224 in FIG. 2.

Figure 4:
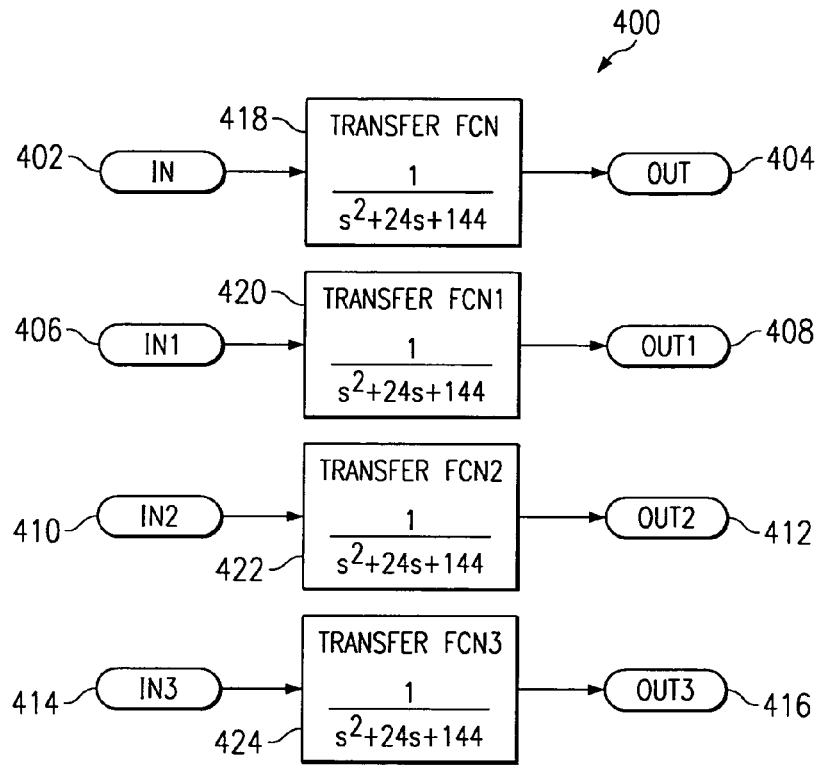
FIG. 4 illustrates an exemplary simplified channel model utilizing an encoder generating complementary Manchester data, which is presented to the channel along with the NRZ source data in which the present invention may be implemented.

FIG. 4 illustrates an exemplary simplified channel model utilizing an encoder generating complementary Manchester data, which is presented to the channel along with the NRZ source data in which the present invention may be implemented. The channel model illustrated in FIG. 4, may be, for example, channel 224 in FIG. 2. Manchester data is presented to the channel along with the NRZ source data in which the present invention may be implemented. In this example, the channel is modeled with a double-pole at 2 GHz to provide a simple attenuation characteristic. Terminals 402, 406, 410, and 414 receive data, for example, Manchester source data 212 and NRZ source data 214 in FIG. 2. Then each respective transfer function processes the data, for example, transfer functions 418, 420, 422, and 424 which may be written as:

$$\frac{1}{s^2 + 24s + 144}$$

Thereafter, the data is sent to output ports 404, 408, 412, and 416 to provide output, such as, for example, outputs 242, 244, 248, and 252 in FIG. 2.

Figure 5A:
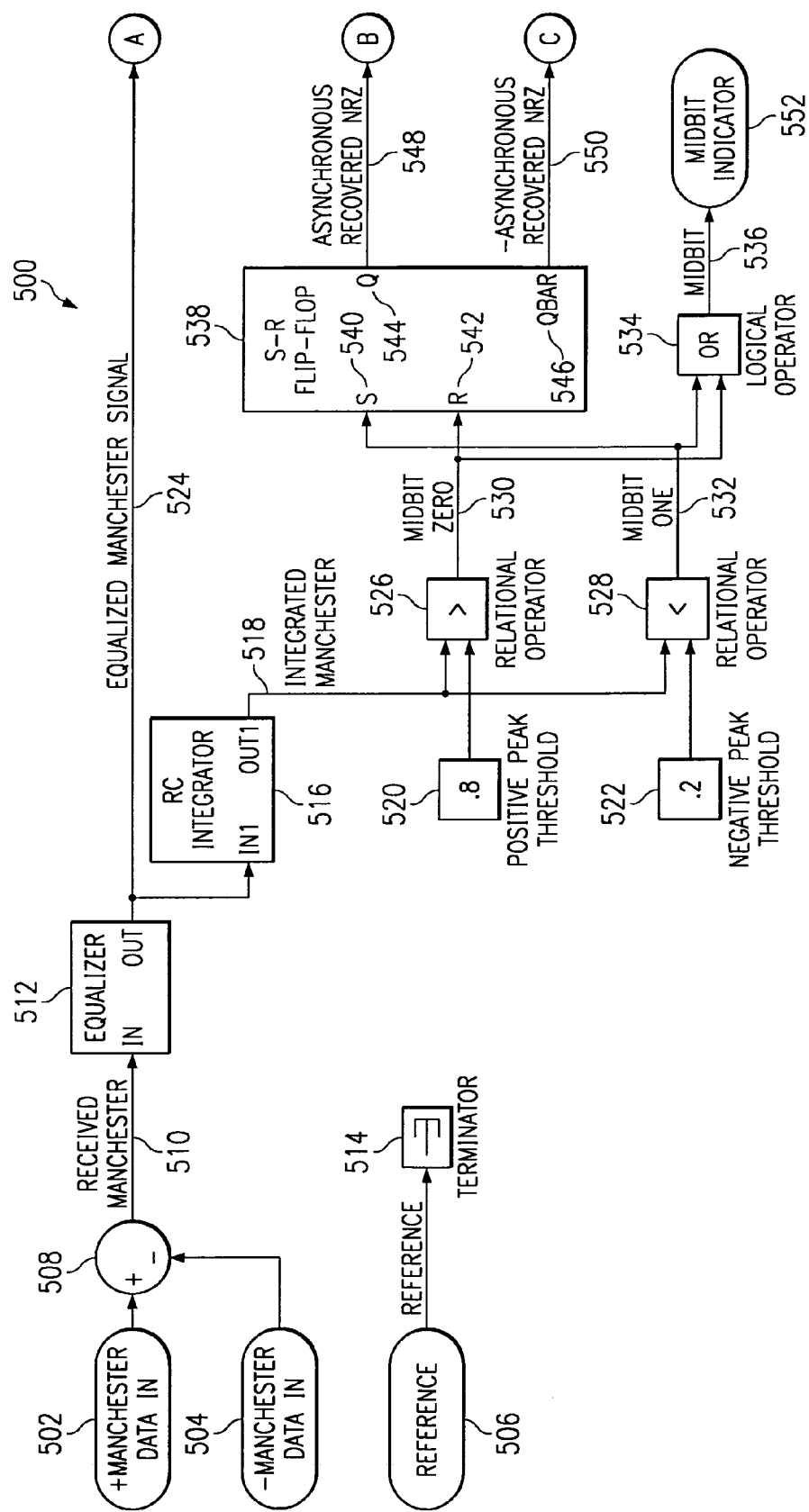
FIGS. 5A and 5B illustrate an exemplary block diagram for the clock data recovery (CDR) system in which the present invention may be implemented.
Figure 5B:
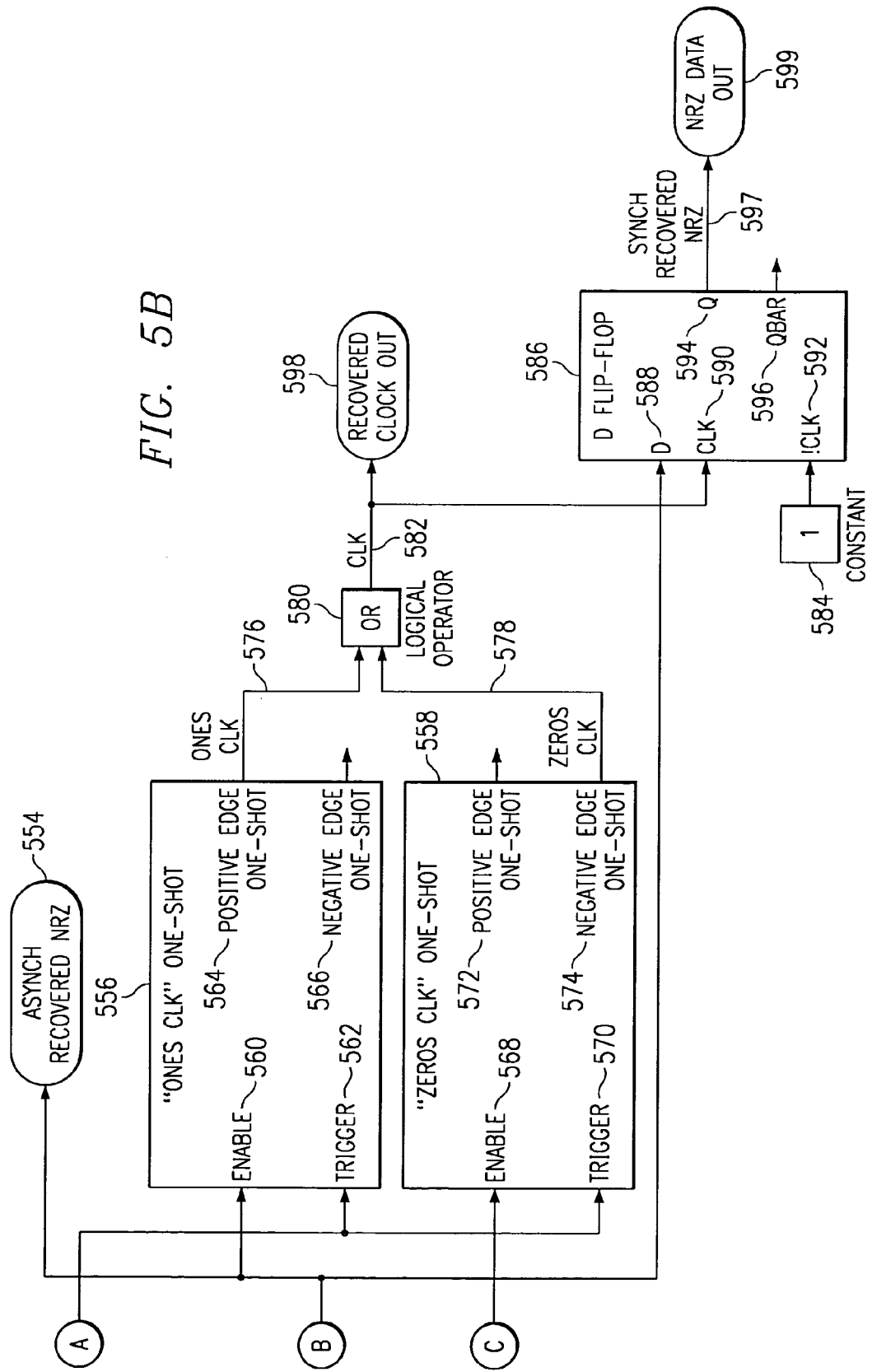

FIGS. 5A and 5B illustrate an exemplary block diagram for the clock data recovery (CDR) system in which the present invention may be implemented. The frequency spectrum for Manchester data is centered around the clock frequency but is significantly narrower than a NRZ spectrum or that for most run-length limited (RLL) codes (e.g., 8B/10B). Although the loss introduced by the channel increases with frequency, the range over which equalization is required for Manchester is significantly less than for the broader range NRZ and RLL codes.

In this example, Manchester data in positive (+) signal 502 and Manchester data in negative (−) signal 504 are transmitted to data node 508. Reference data may be received at terminal 506 and may then be transmitted to terminator 514. Terminator 514 may be similar to terminators 246, 250, and 254 in FIG. 2. In this example, terminator 514 is not used but may be used for a single ended system. Manchester data in positive (+) signal 502 and Manchester data in negative (−) signal 504 are combined at data node 508 and the resulting output is received Manchester data signal 510. Received Manchester data signal 510 is then transmitted to equalizer 512. Equalizer 512 is used to reduce distortion and compensate for frequency dependent signal loss (attenuation) over long distances. Equalizer 512 processes the data and equalized Manchester data signal 524 is transmitted to RC integrator 516 and also to provide input to "Ones CLK" one-shot 556 and "Zeros CLK" one-shot 558. "Ones CLK" one-shot 556 and "Zeros CLK" one-shot 558 produce an output pulse of a specified duration and height every time each respective one-shot is triggered.

Equalized Manchester data signal 524 is processed by resistive-capacitive (RC) integrator 516 and then integrated Manchester data signal 518 is transmitted to relational "Greater Than" operator 526 and relational "Less Than" operator 528. In addition to integrated Manchester data signal 518, positive peak threshold 520 is transmitted to relational "Greater Than" operator 526. Also, in addition to integrated Manchester data signal 518, relational "Less Than" operator 528 receives negative peak threshold 522.

Relational "Greater Than" operator 526 will analyze integrated Manchester data signal 518 from RC integrator 516 and output a data bit every time integrated Manchester data signal 518 reaches a predetermined value. For example, each time the integrated Manchester data signal 518 reaches a value above 80% of its expected peak value, a data bit is produced by relational "Greater Than" operator 526. Likewise, relational "Less Than" operator 528 will analyze integrated Manchester data signal 518 and output a data bit every time integrated Manchester data signal 518 reaches a predetermined value, for example, less than 20% of its expected maximum negative peak value.

The resulting data bit from relational "Greater Than" operator 526 is mid-bit zero 530. The resulting data bit from relational "Less Than" operator 528 is mid-bit one 532. Each mid-bit zero data bit 530 is then transmitted to set-reset (S-R) flip-flop 538 and also transmitted to logical "OR" operator 534. Likewise, each mid-bit one data bit 532 is transmitted to S-R flip-flop 538 and also transmitted to logical "OR" operator 534. S-R flip-flop 538 receives each mid-bit zero 530 data bit at reset (R) input 542 and each mid-bit one data bit at set (S) input 540. S-R Flip-Flop 538 then outputs asynchronous recovered NRZ signal 548 from "Q" output 544 and complementary asynchronous recovered NRZ signal 550 from "Qbar" output 546. Logical "OR" operator 534 produces mid-bit signal 536 to mid-bit indicator 552. Asynchronous recovered NRZ signal 548 is transmitted to asynchronous recovered NRZ terminal 554. Asynchronous recovered NRZ signal 548 is also transmitted to "Ones CLK" one-shot 556 and D flip-flop 586. Complementary asynchronous recovered NRZ signal 550 is transmitted to "Zeros CLK" one-shot 558.

Asynchronous recovered NRZ signal 548 provides enable input 560 to "Ones CLK" one-shot 556. Complementary asynchronous recovered NRZ signal 550 provides enable input 568 to "Zeros CLK" one-shot 558. Equalized Manchester signal 524 provides trigger inputs 562 and 570 to "Ones CLK" one-shot 556 and "Zeros CLK" one-shot 558, respectively. Then "Ones CLK" one-shot 556 outputs "Ones CLK" signal 576 from positive edge one-shot 564. "Zeros CLK" one-shot outputs "Zeros CLK" output 578 from negative edge one-shot 574. Both "Ones CLK" signal 576 and "Zeros CLK" signal 578 are transmitted to logical "OR" operator 580. Logical "OR" operator subsequently outputs "CLK" signal 582 and is transmitted to recovered clock out terminal 598 and is further transmitted to D flip-flop 586.

D flip-flop 586 receives asynchronous recovered NRZ signal 548 at "D" input 588, "CLK" signal 582 at "CLK" input 590, and constant 584 at "CLKbar" 592. D flip-flop 586 then outputs synchronous recovered NRZ signal 597 and it is transmitted to NRZ data out terminal 599.

Figure 6:
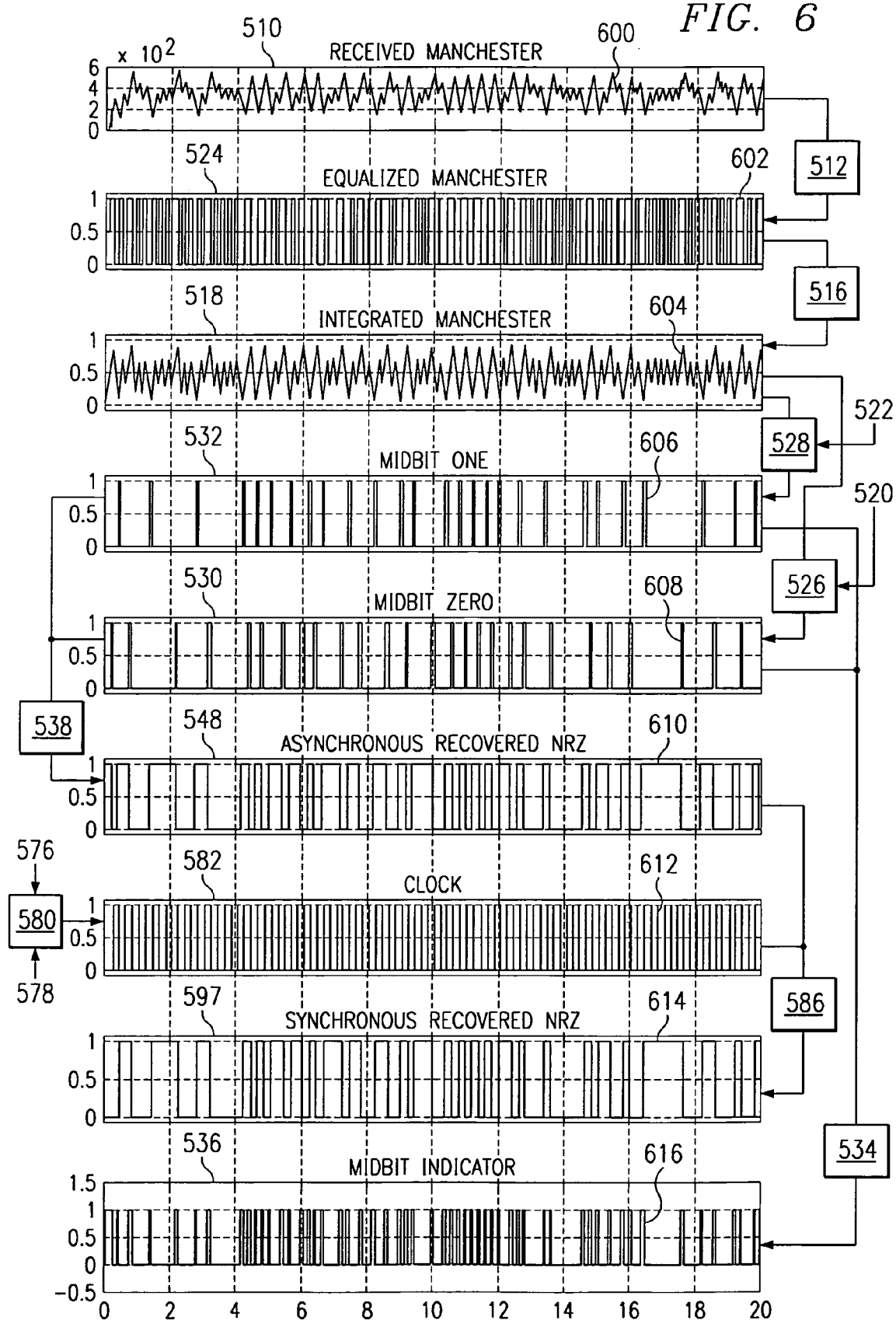
FIG. 6 illustrates exemplary waveforms for the signals in the exemplary block diagram in FIG. 5 which illustrates the clock data recovery (CDR) system in which the present invention may be implemented.

FIG. 6 illustrates exemplary waveforms for the signals in the exemplary block diagram in FIG. 5 which illustrates the clock data recovery (CDR) system in which the present invention may be implemented. The reference numbers in FIG. 6 refer to the respective data signals indicated in FIG. 5. In this example, FIG. 6 shows waveform 600 which represents received Manchester data signal 510. After received Manchester data signal 510 is equalized by equalizer 512, the output, equalized Manchester data signal 524, is represented by waveform 602. Then equalized Manchester data signal 524 is integrated by integrator 516 and, the output, integrated Manchester data signal 518, is represented by waveform 604. After combining integrated Manchester data signal 518 with positive peak threshold 520 in relational operator 526, the output, midbit zero signal 530, is represented by waveform 608. Likewise, after combining integrated Manchester data signal 518 with negative peak threshold 522 in relational operator 528, the output, midbit one signal 532, is represented by waveform 606.

Then midbit zero signal 530 and midbit one signal 532 are combined in logical operator 534 and, the output, midbit indicator signal 536, is represented by waveform 616. Also, midbit zero signal 530 and midbit one signal 532 are input to S-R flip flop 538 and, the output, asynchronous recovered NRZ signal 548, is represented by waveform 610. "Ones CLK" signal output 576 and "Zeros CLK" signal output 578 are combined in logical operator 580 and, the output, "CLK" signal 582, is represented by waveform 612. Asynchronous recovered NRZ signal 548 and "CLK" signal 582 are input to D flip-flop 586 and, the output, synchronous recovered NRZ signal 597, is represented by waveform 614.

Figure 7:
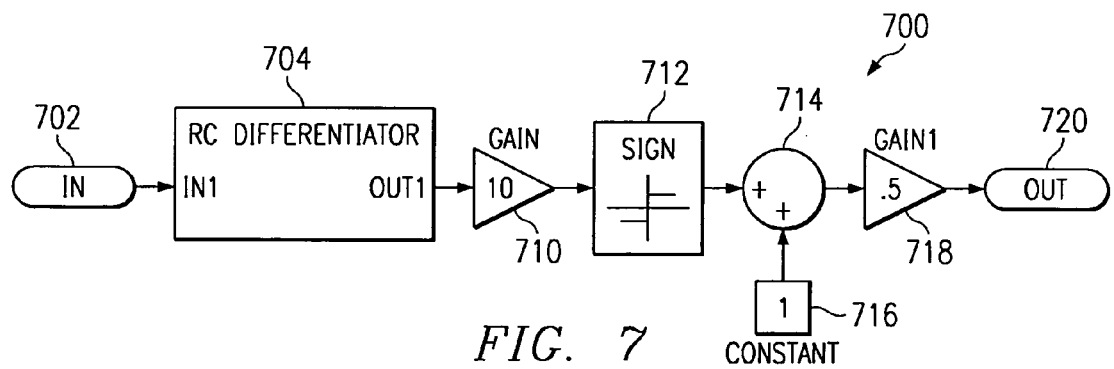
FIG. 7 illustrates an exemplary equalizer utilizing the combination of a RC differentiator with gain and a comparator in which the present invention may be implemented.

FIG. 7 illustrates an exemplary equalizer utilizing the combination of a RC differentiator with gain and a comparator in which the present invention may be implemented. The equalizer depicted in FIG. 7 may be, for example, equalizer 512 in FIG. 5A.

In this example, a signal is received at "in" input 702 which may be, for example, received Manchester data signal 510 in FIG. 5A. The data signal is then transmitted to RC differentiator 704. RC differentiator 704 processes the signal and the processed signal is then transmitted to gain element 710. Gain element 710 amplifies the signal to a specified level, such as 10 in this example, and transmits the amplified signal to Sign element 712. Sign element 712 may return a positive output signal value, for example, a "+1" for an input signal greater than or equal to zero and a negative output signal value, for example, a "−1" for an input signal less than or equal to zero. After being processed by Sign element 712, the signal is then transmitted to data node 714. Data node 714 also receives constant input signal 716. The signed amplified signal and constant 716 are combined and the output is transmitted to Gain1 element 718 in which the signal may be decreased. The signal is then transmitted to terminal 720 to provide input. The input may be, for example, equalized Manchester data signal 524 or provide input to RC integrator 516 as in FIG. 5A.

Figure 8:
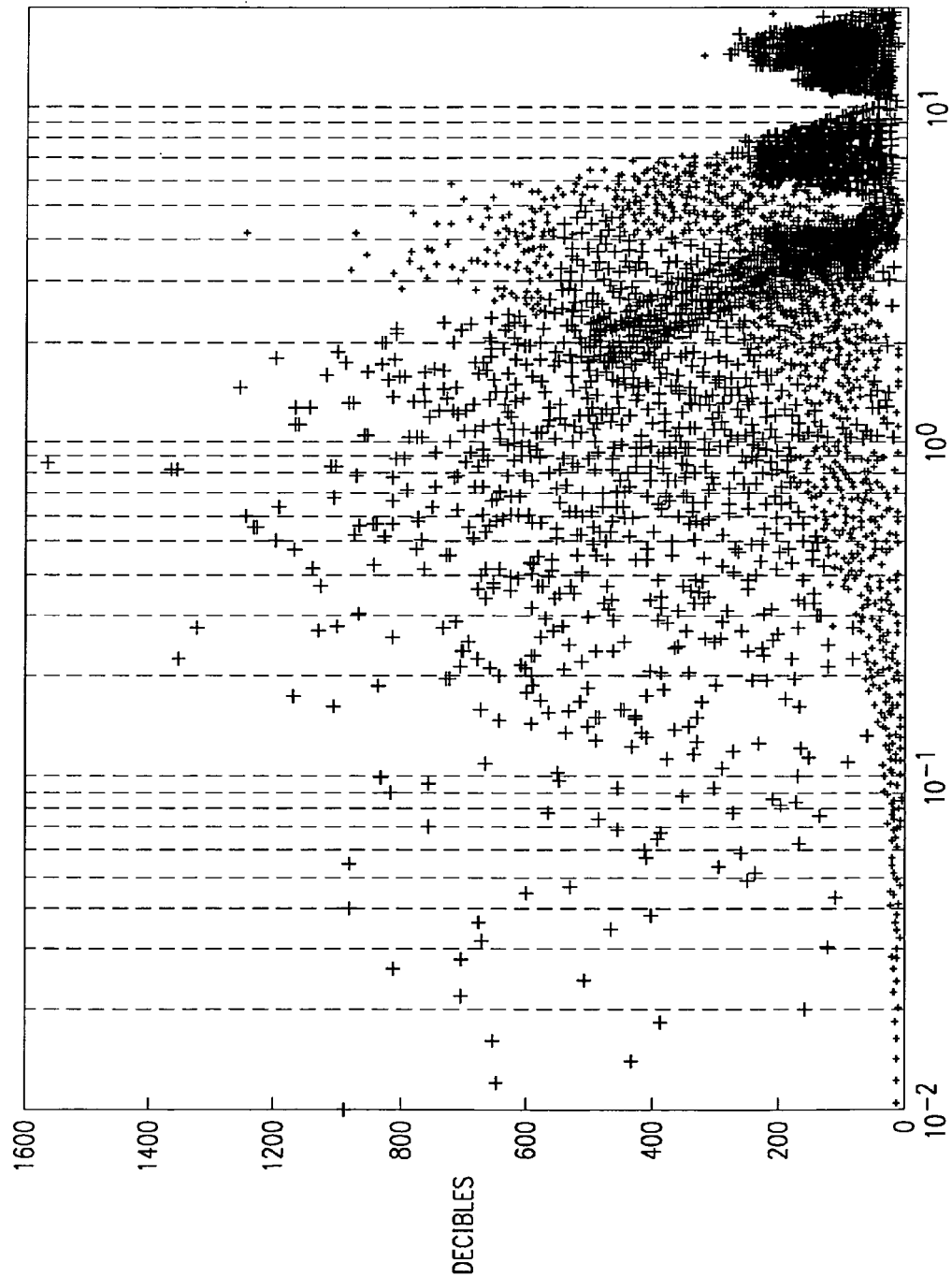
FIG. 8 illustrates a comparison of power spectral density for non-return to zero Manchester transmission data to the transmission frequency of such data for which the present invention may be implemented.

FIG. 8 illustrates a comparison of power spectral density for non-return to zero Manchester transmission data to the transmission frequency of such data for which the present invention may be implemented. The integrated Manchester signal has its positive and negative peaks captured using conventional peak detectors and thresholds are generated which are slightly less than and greater than these values, respectively. These offsets may be created as a proportion of the peak value using, for example, resistive dividers. These thresholds are used with the two comparators to sense the mid-bit one transitions and mid-bit zero transitions as shown in FIG. 5A. These mid-bit indications are asynchronous at this point since these comparators switch before the transition has actually occurred (i.e. at the peak value of the integrated signal).

An asynchronous NRZ signal, as shown in FIG. 6, may be created using a S-R flip-flop, for example, the S-R flip-flop shown in FIG. 5A. The clock and synchronous NRZ data signals, as shown in FIG. 6, may be generated using conditionally triggered one-shots, for example, the one-shots shown in FIG. 5B. The duty cycle of these one-shots may not be crucial if only rising clock transitions are used for deserialization, eliminating the strong variation expected for the transport delays (e.g., inverter chains) due to the operation of the present invention. Since transport delay has poor tolerance, only the edge which changes independently from the delay is used. The zero transition simply restores the state, readying the state for the next transition.

Figure 9:
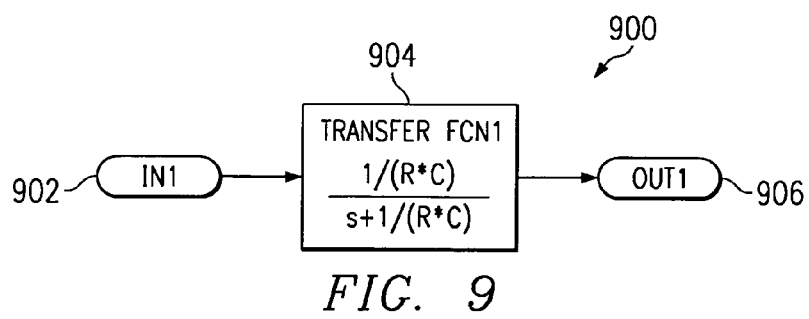
FIG. 9 illustrates an exemplary RC integrator which distinguishes the mid-bit transitions from the transitions at the bit boundaries in which the present invention may be implemented.

FIG. 9 illustrates an exemplary RC integrator which distinguishes the mid-bit transitions from the transitions at the bit boundaries in which the present invention may be implemented. The RC integrator as depicted in FIG. 9 may be, for example, RC integrator 516 in FIG. 5A. Distinguishing the mid-bit transitions from the transitions at the bit boundaries may be accomplished by this RC integrator, a positive and negative peak detector, and two high-speed comparators. Only the mid-bit transitions between a 1 and 0 (or 0 and 1) may be sensed with this approach.

In this example, a signal is received at terminal 902 which may be an equalized signal such as, for example, equalized Manchester data signal 524 in FIG. 5A. This signal is then transmitted and processed by transfer function 904, which may be written as:

$$\frac{1/(RC)}{s + 1/(RC)}$$

The processed signal is then transmitted to terminal 906 in which the signal may provide input. The input may be, for example, to a relational operator, such as, for example, relational operators 526 and 528 in FIG. 5A.

Figure 10:
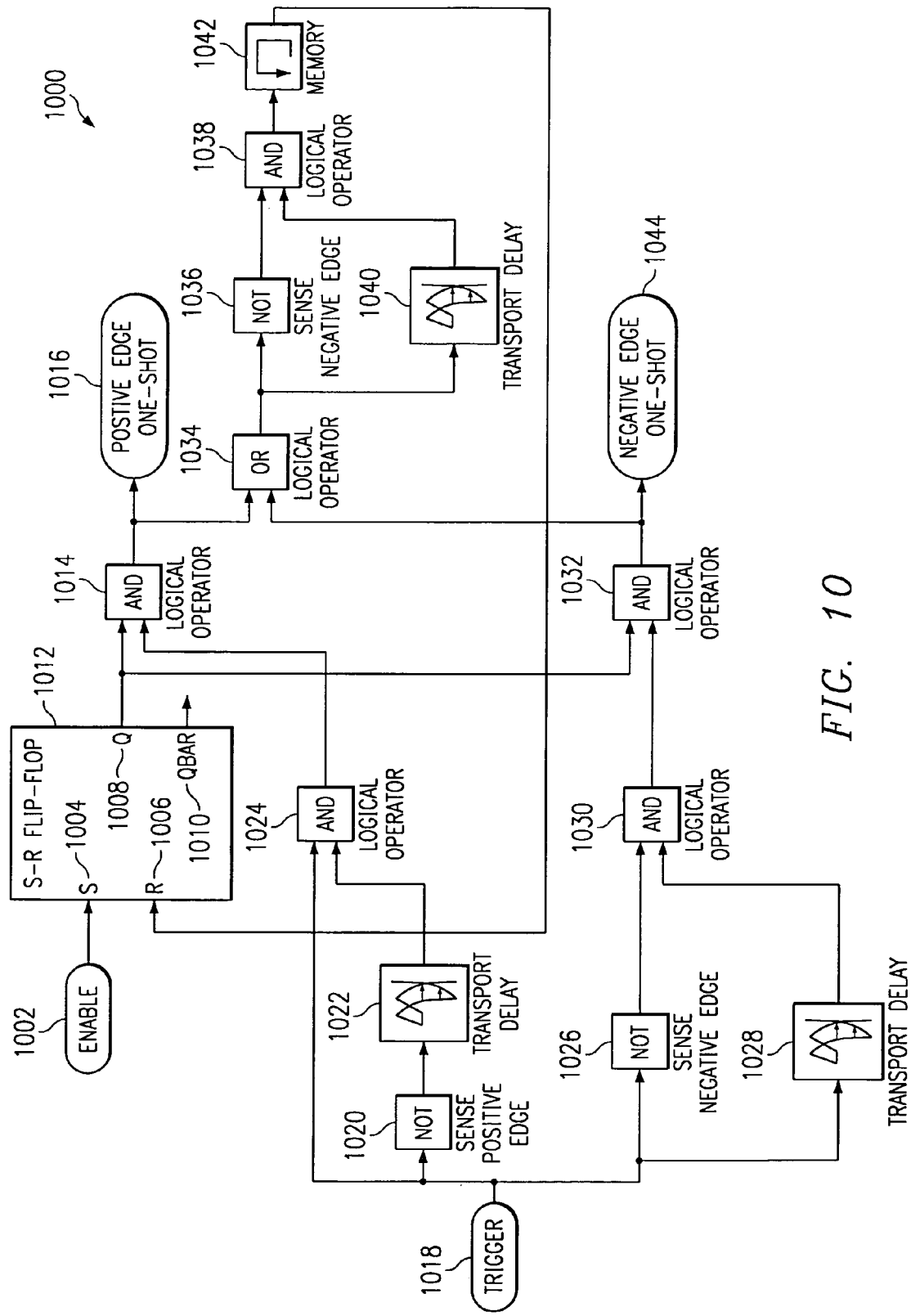
FIG. 10 illustrates exemplary clock and synchronous NRZ data which may be generated using conditionally-triggered one-shots in which the present invention may be implemented.

FIG. 10 illustrates an exemplary clock and synchronous NRZ data which may be generated using conditionally-triggered one-shots in which the present invention may be implemented. The one-shot depicted in FIG. 10 may be, for example, "Ones CLK" one-shot 556 and "Zeros CLK" one-shot 558 shown in FIG. 5B.

In this example, enable terminal 1002 provides input to S-R flip-flop 1012. In addition, S-R flip-flop 1012 receives an input signal from the output of memory 1042.

S-R flip-flop 1012 provides output signals to logical "AND" operator 1014 and logical "AND" operator 1032.

Trigger terminal 1018 provides input to sense positive edge "NOT" operator 1020, logical "AND" operator 1024, sense negative edge "NOT" operator 1026, and transport delay 1028. Sense positive edge "NOT" operator 1020 provides an input signal to transport delay 1022, which in turn provides an input signal to logical "AND" operator 1024. Logical "AND" operator 1024 then provides an input signal to logical "AND" operator 1014. Both sense negative edge "NOT" operator 1026 and transport delay 1028 provide input signals to logical "AND" operator 1030. Logical "AND" operator 1030 then provides an input signal to logical "AND" operator 1032. Logical "AND" operator 1032 then provides an input signal to logical "OR" operator 1034 and also sends a signal to negative edge one-shot terminal 1044.

Logical "AND" operator 1014 takes both input signals from S-R flip-flop 1012 "Q" output 1008 and logical "AND" operator 1024 and outputs a signal to logical "OR" operator 1034 and provides an output to positive edge one-shot terminal 1016. Logical "OR" operator 1034 then provides an input to sense negative edge "NOT" operator 1036 and transport delay 1040. Both sense negative edge "NOT" operator 1036 and transport delay 1040 provide an input to logical "AND" operator 1038 which in turn provides an input to memory 1042. Memory 1042 then provides the input to S-R flip-flop 1012 at "R" input 1006.

Figure 11A:
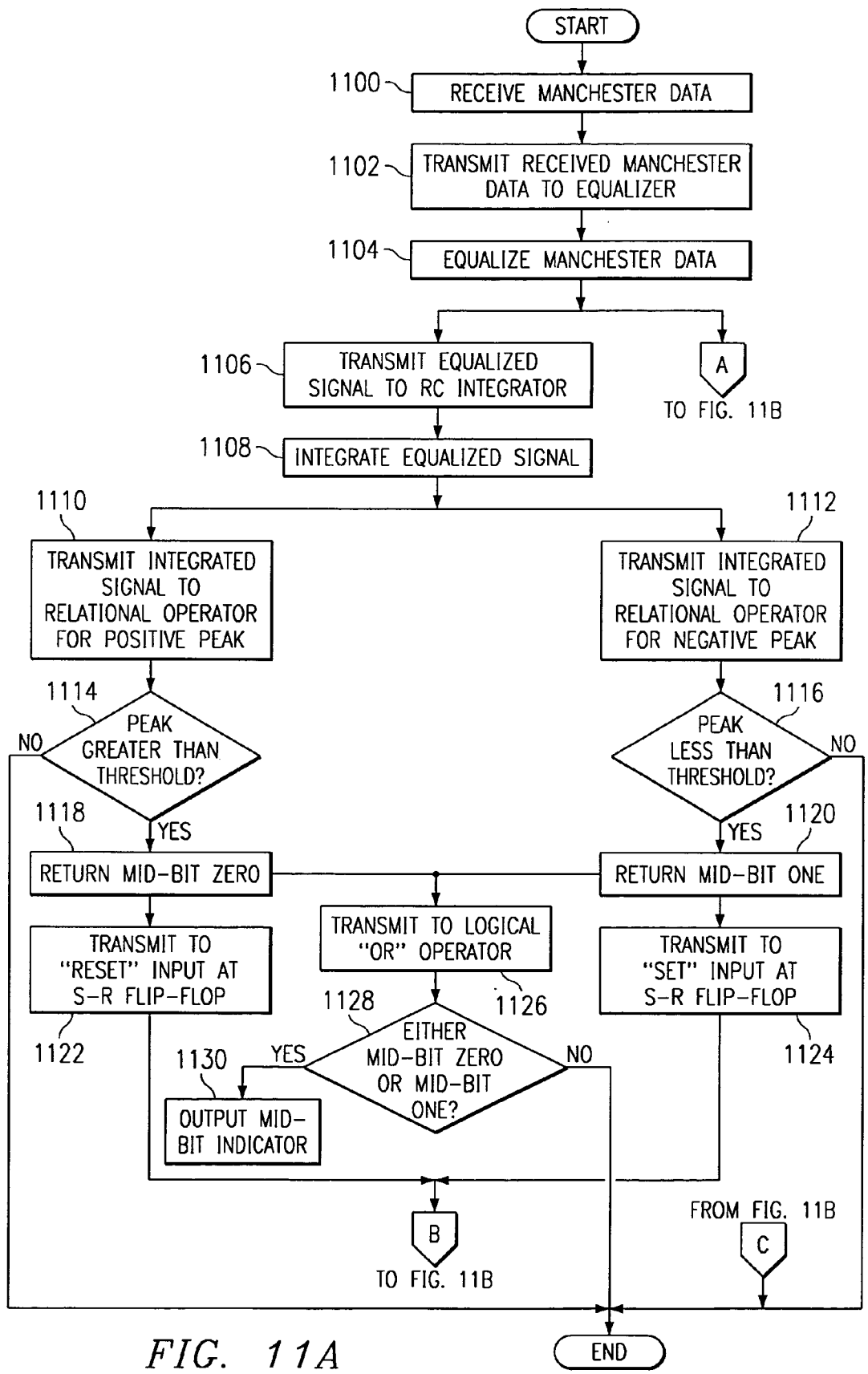
FIG. 11 is a flowchart outlining an exemplary operation for performing the clock/data recovery for self-clocked high speed interconnect method according to the present invention.
Figure 11B:
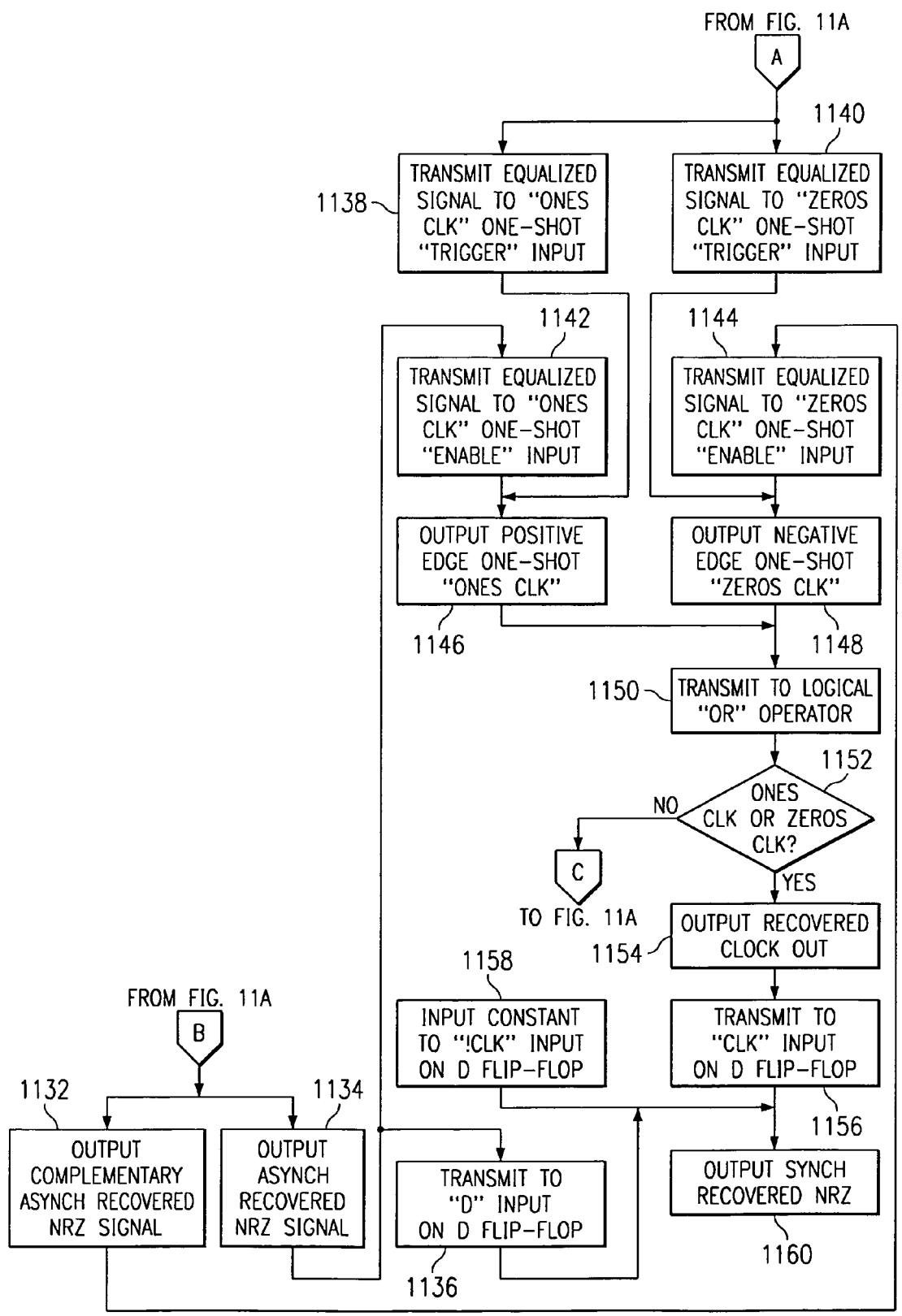

FIG. 11 is a flowchart outlining an exemplary operation for performing the clock/data recovery for self-clocked high speed interconnect method according to the present invention. The method illustrated in FIG. 11 may be performed by a clock data recovery (CDR) system, such as, for example, clock data recovery system 500 in FIGS. 5A and 5B.

The operation begins with receiving Manchester data (step 1100) and transmitting the Manchester data to an equalizer (step 1102). The Manchester data is equalized (step 1104) and the resulting equalized signal is transmitted to a RC integrator (step 1106) and also provides a "Trigger" input to a "Ones CLK" one-shot (step 1138) and a "Trigger" input to a "Zeros CLK" one-shot (step 1140). The equalized signal sent to the RC integrator (step 1106) is integrated (step 1108) and then transmitted to a relational operator to sense the positive peak of the signal (step 1110) and an relational operator to sense the negative peak of the signal (step 1112).

Then, a determination is made as to whether or not the positive peak of the signal is greater than a predetermined threshold (step 1114). If it is determined that the peak is not greater than the predetermined positive peak threshold (step 1114:NO), the operation terminates. Otherwise, if the positive peak is greater than the predetermined threshold (step 1114:YES), a mid-bit zero is returned (step 1118). Likewise, a determination is made as to whether or not the negative peak of the signal is less than a predetermined threshold (step 1116). If it is determined that the negative peak is not less than the predetermined threshold (step 1116:NO), the operation terminates. If it is determined that the negative peak is less than the predetermined threshold (step 1116:YES), a mid-bit one is returned (step 1120).

The resulting mid-bit zero or mid-bit one are then transmitted to provide further input for the operation. The mid-bit zero or the mid-bit one is transmitted to provide input to a S-R flip-flop (steps 1122 and 1124) and a logical "OR" operator (step 1126). For either the mid-bit zero or the mid-bit one transmitted to the logical "OR" operator (step 1126), it is determined as to whether or not either of the transmitted mid-bits are a zero or a one (step 1128). If it is determined that neither of the midbits is a zero or a one (step 1128:NO), the operation terminates. Otherwise, if it is determined that either of the midbits is a zero or a one (step 1128:YES), a mid-bit indicator is output (step 1130). The mid-bit zero is transmitted and also provides "Reset" input to the S-R flip-flop (step 1122). The mid-bit one is transmitted and also provides "Set" input to the S-R flip-flop (step 1124). The S-R flip-flop then outputs an asynchronous recovered NRZ signal (step 1134) and a complementary asynchronous recovered NRZ signal (step 1132). The asynchronous recovered signal provides "D" input to a D flip-flop (step 1136). In addition, the asynchronous recovered NRZ signal is transmitted and provides an "Enable" input to a "Ones CLK" one-shot (step 1142). The complementary asynchronous recovered NRZ signal is transmitted and provides an "Enable" input to a "Zeros CLK" one-shot (step 1144).

The "Ones CLK" one-shot then provides a positive edge "Ones CLK" signal (step 1146) and the "Zeros CLK" one-shot provides a negative edge "Zeros CLK" signal (step 1148). Both the "Ones CLK" signal and the "Zeros CLK" signal are transmitted to a logical "OR" operator (step 1150) and then it is determined as to whether or not either of the transmitted signals is a "Ones CLK" or a "Zeros CLK" signal (step 1152). If it is determined that neither of the signals is either a "Ones CLK" or a "Zeros CLK" (step 1152:NO), the operation terminates. Otherwise, if it is determined that either of the signals is a "Ones CLK" or a "Zeros CLK" (step 1152:YES), the output is a recovered clock out signal (step 1154). The recovered clock out signal is then transmitted and provides "CLK" input to a D flip-flop (step 1156). The D flip-flop takes the "D" input (step 1136), the "CLK" input (step 1156) and a predetermined constant "CLKbar" input (step 1158) and outputs a synchronous recovered NRZ signal (step 1160).

Thus, the present invention provides an improved method and system for clock/data recovery for self-clocked high speed interconnects. The present invention will eliminate the requirement for advanced clock and data recovery techniques using phase locked loops (PLLs) or exotic surface-acoustic-wave (SAW) filters. The present invention receives data for mid-bit transitions in a data signal which may not have an edge transition immediately preceding the bit. The received data is then equalized and may provide a series of further input signals for the clock data recovery (CDR) system of the present invention. Thus, the present invention improves on prior clock data recovery systems using precise delay-lines or one-shots which are difficult to integrate precisely using existing CMOS process technology speeds much lower than those supported by existing technology.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art.

This embodiment was chosen and described in order to best explain the principles of the invention, the practical application, and to enable others of ordinary skill in the art to understand the invention for various embodiments with various modifications as are suited to the particular use contemplated.

What is claimed is:

1. A signal recovery method for a self-clocked transmission system, comprising the steps of:
   equalizing a received data signal to form an equalized data signal;
   integrating the equalized data signal;
   inputting the equalized data signal to both a first monostable circuit component and a second monostable circuit component;
   generating a first output signal from the first monostable circuit component and a second output signal from the second monostable circuit component;
   comparing the first output signal and the second output signal to each other using a first logical operator;
   outputting a compared output signal based on the comparison, wherein the compared output signal is a recovered clock output signal; and
   generating a third output signal by comparing the integrated equalized data signal to a peak threshold.

2. The method of claim 1, wherein the signal recovery consists of a clock signal and a data signal.

3. The method of claim 1, wherein the first logical operator is an OR-gate logical operator.

4. The method of claim 1, wherein the recovered clock output signal is a positive edge clock signal or a negative edge clock signal.

5. The method of claim 1, wherein at least one of the first monostable circuit component or the second monostable circuit component is a one-shot circuit component.

6. The method of claim 1, wherein the first generated output signal is a ones clock output signal or a zeros clock output signal.

7. The method of claim 1, wherein the second generated output signal is a ones clock output signal or a zeros clock output signal.

8. The method of claim 1, wherein equalizing the received data signal includes;
   differentiating the received data signal to form a differentiated data signal;
   amplifying the differentiated data signal to form an amplified data signal;

applying a sign element to the amplified data signal to form a signed amplified data signal; and
decreasing the signed amplified data signal.

9. The method of claim 8, further comprising:
combining a constant value with the signed amplified data signal.

10. The method of claim 8, wherein differentiating the received data signal includes a resistive-capacitive differentiator.

11. The method of claim 1, wherein processing the data signal comprises:
inputting the third generated output signal to a flip-flop circuit component; and
outputting a fourth output signal from the flip-flop circuit component.

12. The method of claim 11, wherein the third generated output signal is a mid-bit zero output signal or a mid-bit one output signal.

13. The method of claim 11, wherein the equalized data signal uses a resistive-capacitive integrator.

14. The method of claim 11, wherein the relational operator is a greater than relational operator or a less than relational operator.

15. The method of claim 11, wherein the peak threshold is a positive peak threshold or a negative peak threshold.

16. The method of claim 11, wherein the flip-flop circuit component is a set-reset flip-flop circuit component.

17. The method of claim 11, wherein the third generated output signal is inputted to a set input terminal or a reset input terminal of the flip-flop circuit component.

18. The method of claim 11, wherein the fourth generated output signal is an asynchronous recovered non-return to zero output signal or a complementary recovered non-return to zero output signal.

19. The method of claim 11, further comprising:
inputting the third generated output signal to a second logical operator; and
outputting a fifth output signal from the second logical operator, wherein the fifth output signal is a mid-bit output signal.

20. The method of claim 19, wherein the second logical operator is an OR-gate logical operator.

21. The method of claim 1, wherein inputting the data signal to both a first monostable circuit component and a second monostable circuit component further includes:
inputting a processed equalized data signal to the first monostable circuit component;
inputting an asynchronous recovered non-return to zero output signal to the first monostable circuit component; and
inputting a processed equalized data signal to the second monostable circuit component; and
inputting an complementary asynchronous recovered non-return to zero output signal to the second monostable circuit component.

22. The method of claim 21, wherein the processed equalized data signal is inputted at a trigger input terminal of the first monostable circuit component.

23. The method of claim 21, wherein the asynchronous recovered non-return to zero output signal is inputted to an enable input terminal of the first monostable circuit component.

24. The method of claim 21, wherein the processed equalized data signal is inputted to a trigger input terminal of the second monostable circuit component.

25. The method of claim 21, wherein the complementary asynchronous recovered non-return to zero signal is inputted to an enable input terminal of the second monostable circuit component.

26. The method of claim 1, further comprising:
inputting the compared output signal at a flip-flop circuit component;
inputting an asynchronous recovered non-return to zero output signal at the flip-flop circuit component;
inputting a constant signal at the flip-flop circuit component; and
outputting a synchronous recovered non return to zero output signal from the flip-flop circuit component based on the compared output signal, the asynchronous recovered non-return to zero output signal, or the constant signal inputs.

27. The method of claim 26, wherein the flip-flop circuit component is a data flip-flop circuit component.

28. The method of claim 26, wherein the compared output signal is inputted at a clock input terminal of the flip-flop circuit component.

29. The method of claim 26, wherein the asynchronous recovered non-return to zero output signal is inputted at a data input terminal of the flip-flop circuit component.

30. The method of claim 26, wherein the constant signal is inputted at a complementary clock input terminal of the flip-flop circuit component.

31. The method of claim 26, wherein the output signal is outputted from the flip-flop circuit component from an output terminal or a complementary output terminal.

32. A signal recovery system for a self-clocked transmission system, comprising:
an equalizer, wherein the equalizer has an output port;
a first monostable circuit component having at least two input ports and at least two output ports, wherein the output port of the equalizer is connected to a first input port of the first monostable circuit component;
a second monostable circuit component having at least two input ports and at least two output ports, wherein the output of the equalizer is connected to a first input port of the second monostable circuit component;
a first logical operator having at least two input ports and one output port, wherein a first output port of the first monostable circuit component is connected to a first input port of the first logical operator and a first output port of the second monostable circuit component is connected to the second input port of the first logical operator;
an integrator having an input port and an output port, wherein the output port of the equalizer is connected to the input port of the integrator;
a first relational operator having at least two input ports and one output port, wherein the output of the integrator is connected to a first input port of the first relational operator and a threshold constant signal source is connected to a second input port of the first relational operator; and
a second relational operator having at least two input ports and one output port, wherein the output of the integrator is connected to a first input port of the second relational operator and a threshold constant signal source is connected to a second input port of the second relational operator.

33. The system of claim 32, further comprising:
a data flip-flop circuit component having a data input port, a clock input port and a complementary clock input port and having an output port and a complementary output port, wherein the output port of the first logical operator is connected to the clock input port of the data flip-flop circuit component; and a constant signal source, wherein the constant signal source is connected to the complementary clock input port of the data flip-flop circuit component.

34. The system of claim 32, wherein the first logical operator is an OR-gate.

35. The system of claim 32, wherein both the first monostable circuit component and the second monostable circuit component are both one-shot circuit components having at least two input ports and two output ports, and wherein the first input port on both the one-shot circuit components is an enable input port and the second input port is a trigger input port and the first output port on both one-shot circuit components is a positive edge output port and the second output port is a negative edge output port.

36. The system of claim 32, wherein the equalized data signal uses a resistive-capacitive integrator.

37. The system of claim 32, wherein the first relational operator is a greater than relational operator.

38. The system of claim 32, wherein the second relational operator is a less than relational operator.

39. The system of claim 32, wherein the threshold constant signal source is at least one of a positive peak threshold source and a negative peak threshold source.

40. The system of claim 32, further comprising:
a second logical operator having at least two input ports, wherein the output of the first relational operator is connected to a first input port of the second logical operator and the output of the second relational operator is connected to a second input port of the second logical operator.

41. The system of claim 40, wherein the second logical operator is an OR-gate.

42. The system of claim 32, further comprising:
a set-reset flip-flop circuit component, wherein the set-reset flip-flop circuit component has a set input port and a reset input port and has an output port and a complementary output port, wherein the output of the first relational operator is connected to the reset input port of the set-reset flip-flop circuit component and the output of the second relational operator is connected to the set input port of the set-reset flip-flop circuit component, the output port of the set-reset flip-flop circuit component is connected to the enable input port of the first monostable circuit component and the complementary output port of the set-reset flip-flop circuit component is connected to the enable input port of the second monostable circuit component, and wherein the output port is further connected to the data input of the data flip flop circuit component.

43. A signal recovery circuit for a self-clocked transmission system, comprising:
an equalizing circuit having a signal input for receiving a data signal and a signal output for outputting an equalized data signal;

a first monostable clock edge sensing circuit having a trigger signal input connected to the output of the equalizing circuit, an enable input, a positive edge output, and a negative edge output;

a second monostable clock edge sensing circuit having a trigger input connected to the output of the equalizing circuit, an enable input, a positive edge output, and a negative edge output;

a first logical operator having one input connected to the positive edge output of the first monostable positive clock edge sensing circuit and a second output connected to the second monostable negative clock edge sensing circuit and a signal output for outputting a recovered clock out signal; and a second logical element connected at one input to the output of the first relational operator element output and a second input connected to the output of the second relational operator element.

44. The circuit in claim 43, further comprising:
an integrating circuit having a signal input connected to the equalized data signal and a signal output for outputting an equalized integrated data signal;

a relational circuit having a first relational operator element connected at a first input to the output of the integrating circuit and a second input connected to a first peak threshold element and a second relational operator element having a first input connected to the output of the integrating circuit and a second input connected to a second peak threshold element; and a first flip-flop circuit having a set input connected to an output of the second relational operator element and a reset input connected to an output of the first relational operator element, an output connected to the enable input of the first monostable clock edge sensing circuit, and a complementary output connected to the enable input of the second monostable clock edge sensing circuit.

45. The circuit in claim 44, further comprising;
a second flip-flop circuit having a data input connected to the output of the first logical circuit element, having a clock input connected to the output of the first flip-flop circuit, and a complementary clock input connected to a constant signal.

* * * * *